United States Patent
Fleshner

(10) Patent No.: US 8,056,506 B2
(45) Date of Patent: Nov. 15, 2011

(54) INFRARED FEEDER CONTROLLER

(75) Inventor: Thomas D. Fleshner, Shelbyville, IL (US)

(73) Assignee: The GSI Group, LLC, Assumption, IL (US)

( * ) Notice: Subject to any disclaimer, the term of this patent is extended or adjusted under 35 U.S.C. 154(b) by 169 days.

(21) Appl. No.: 12/699,572

(22) Filed: Feb. 3, 2010

(65) Prior Publication Data
US 2010/0200089 A1 Aug. 12, 2010

Related U.S. Application Data

(60) Provisional application No. 61/150,454, filed on Feb. 6, 2009.

(51) Int. Cl.
*A01K 5/00* (2006.01)
*A01K 5/02* (2006.01)

(52) U.S. Cl. .................... 119/57.4; 119/57.1; 119/51.02

(58) Field of Classification Search ................ 119/57.4, 119/57.1, 51.01, 51.02; 137/551, 553, 554
See application file for complete search history.

(56) References Cited

U.S. PATENT DOCUMENTS

| | | | | |
|---|---|---|---|---|
| 6,363,652 B1 * | 4/2002 | Spinelli | ........................ | 43/44.99 |
| 6,779,486 B2 * | 8/2004 | Vaags | ........................ | 119/51.11 |
| 7,124,707 B1 * | 10/2006 | Clarke | ........................ | 119/51.02 |
| 7,513,216 B2 * | 4/2009 | Neckel | ........................ | 119/51.02 |
| 2003/0070622 A1 * | 4/2003 | Vaags | ........................ | 119/51.11 |
| 2006/0185604 A1 * | 8/2006 | Neckel | ........................ | 119/51.02 |
| 2007/0044723 A1 * | 3/2007 | Anderbery | ................ | 119/51.02 |
| 2007/0051317 A1 * | 3/2007 | Bruner | ........................ | 119/53 |
| 2007/0144446 A1 * | 6/2007 | Neckel | ........................ | 119/51.02 |
| 2008/0251024 A1 * | 10/2008 | Bos et al. | .................. | 119/14.18 |
| 2009/0056640 A1 * | 3/2009 | Gross | ........................ | 119/702 |
| 2011/0126770 A1 * | 6/2011 | Mulder et al. | ............. | 119/51.01 |
| 2011/0146580 A1 * | 6/2011 | Jalbert et al. | ............... | 119/51.02 |

OTHER PUBLICATIONS

HALO—Feed System Control—Infrared Sensing Technology—"Installation and Operating Instructions"—Model #: HALOJRMAX—Printed Dec. 2007—8 pages (including cover page).

* cited by examiner

*Primary Examiner* — Yvonne R. Abbott
(74) *Attorney, Agent, or Firm* — Polster, Lieder, Woodruff & Lucchesi, L.C.

(57) ABSTRACT

A control assembly for use in a feed delivery assembly comprises a housing having an inlet, an outlet, and a chamber between said inlet and outlet. The chamber is opened in a plane parallel, but radially offset from, an axis of the inlet and outlet. A tube member is removably receivable in the chamber. The removable tube member includes a tube having a length sufficient to span a distance between the inlet and outlet tubes. At least one infrared emitter and at least one infrared receiver are mounted on the tube member tube and are positioned to be opposed to each other such that the receiver will receive and detect light from the emitter. The emitter and receiver are operatively connected to a controller. The controller emits a signal when it is determined that the light from the emitter to the receiver is interrupted.

17 Claims, 7 Drawing Sheets

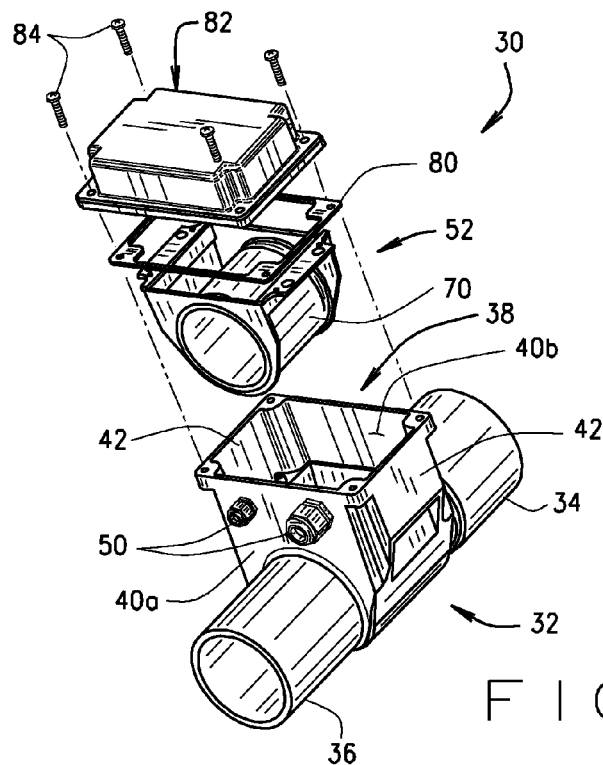
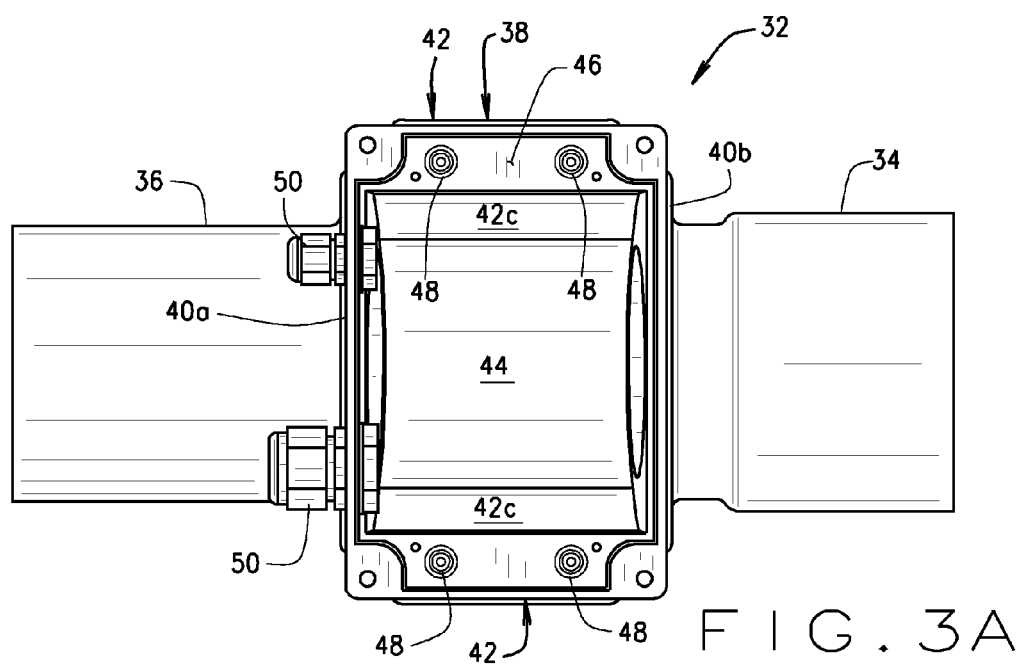

US 8,056,506 B2

INFRARED FEEDER CONTROLLER

CROSS-REFERENCE TO RELATED APPLICATIONS

This application claims priority to U.S. Provisional Application No. 61/150,454 filed Feb. 6, 2009, and which is incorporated herein by reference.

STATEMENT REGARDING FEDERALLY SPONSORED RESEARCH OR DEVELOPMENT

Not Applicable.

BACKGROUND OF THE INVENTION

This application relates to controllers for feed delivery systems, and in particular to a controller which utilizes infrared sensors to determine when feed has stopped flowing through a feed delivery system.

Infrared sensors for use in feed delivery systems are known. For example, Controltech Corporation of Bondurant, Iowa sells a feed controller which utilized infrared sensors under the name HALO™. However, in controllers such as the Halo controller the infrared light transmitter (i.e., an LED) and the infrared light sensor or receiver are in the tube through which the feed passes, and are thus directly exposed to, and in contact with, the feed. Thus, the sensor components can become covered in feed dust. Further, the feed dust could infiltrate the electronics of the controller, and affect the operation of the controller.

Additionally, feed controllers are placed directly in the drop tube of a feed system, and define or form part of the drop tube. Should the controller become inoperable for some reason, the drop tube must be disassembled to remove the controller.

It would be desirable to provide a controller which utilizes infrared sensing technology, but in which the emitter and receiver are protected from the dust of the feed environment. It would also be desirable to provide a controller can be easily repaired or replaced without the need to disassemble the drop tube in which the controller is positioned.

BRIEF SUMMARY OF THE INVENTION

A control assembly for use in a feed delivery assembly comprises a housing having an inlet, an outlet, and a chamber between said inlet and outlet. The chamber is opened in a plane parallel, but radially offset from, an axis of the inlet and outlet. A tube member is removably receivable in the chamber. The removable tube member includes a tube having a length sufficient to span a distance between the inlet and outlet tubes. At least one infrared emitter and at least one infrared receiver are mounted on the tube member tube and are positioned to be opposed to each other such that the receiver will receive and detect light from the emitter. The emitter and receiver are operatively connected to a controller. The controller emits a signal when it is determined that the light from the emitter to the receiver is interrupted.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
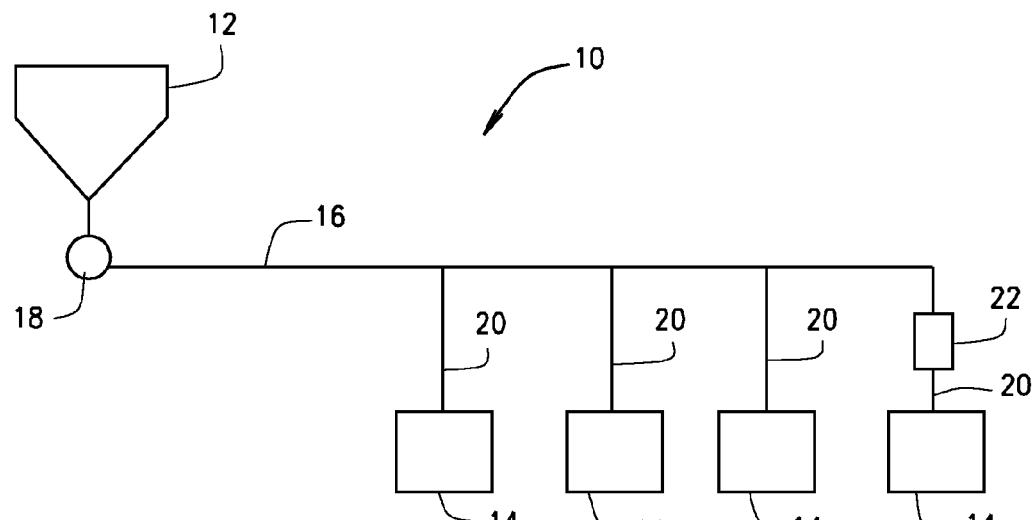
FIG. 1 is a schematic of a feed system incorporating a feed controller.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A feed delivery system 10 typically includes a hopper 12 containing feed, a plurality of feed bins 14, and a feed delivery tube 16 which delivers the feed from the hopper to the bins. Typically, an auger (not shown) extends through the delivery tube 16 and is driven by a motor 18 to carry the feed from the hopper 12 through the tube 16 to the bins 14. Additionally, the system 10 has drop tubes 20 which extend downwardly from the delivery tube 16 to the bins 14, there being at least one drop tube per bin. As can be appreciated, when the respective bins are full of feed, their respective drop tubes fill with feed. As the bins are filled, their drop tubes will fill with feed in a consecutive manner. When the drop tube of the last bin in the system fills with feed, all the bins have been filled with feed. Typically, a controller 22 is provided in the last drop tube. The controller 22 includes a sensor to determine when the drop tube fills with feed. Upon sensing this condition, the controller sends a signal which deactivates the motor 18 to stop delivery of feed through the system 10.

Figure 2A:
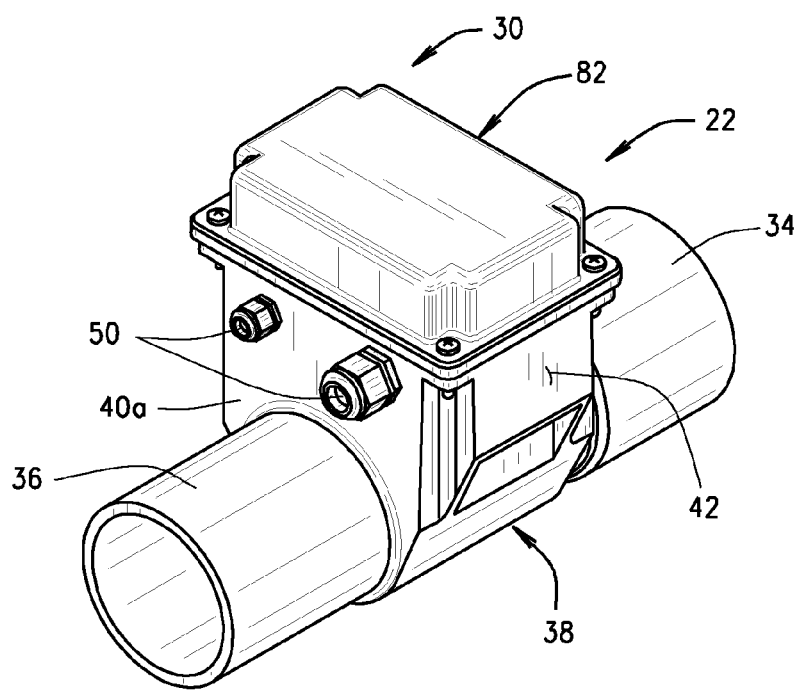
FIGS. 2A and B are perspective and exploded views, respectively, of an illustrative infrared controller assembly constructed in accordance with the claims.

The controller 22 can comprise a control assembly 30, such as shown generally in FIGS. 2A and 2B. The control assembly 30 comprises a housing 32 having an inlet tube 34, an outlet tube 36, and a chamber 38 positioned between and in line with the inlet and outlet tubes. The inlet and outlet tubes are sized to be connected to the tubing which comprises the drop tube 20 in which the control assembly is positioned. As shown, the inlet tube 34 is larger than the outlet tube 36. Hence, with the configuration shown, the outlet tube is received in a lower portion of the drop tube and the inlet tube 34 receives an upper portion of the drop tube. However, both the inlet and outlet tubes could receive, or be received by, their respective portions of the drop tube. Alternatively, the inlet tube could be received by the upper portion of the drop tube and the outlet tube could receive the upper portion of the drop tube. In a further alternative, a coupler could be used to connect the inlet and outlet tubes to the drop tube. As can be appreciated, the housing 32 (and hence the control assembly 30) can be placed in the drop tube 20 by most any acceptable method which will allow feed to pass through the housing (as will be described below).

Figure 3B:
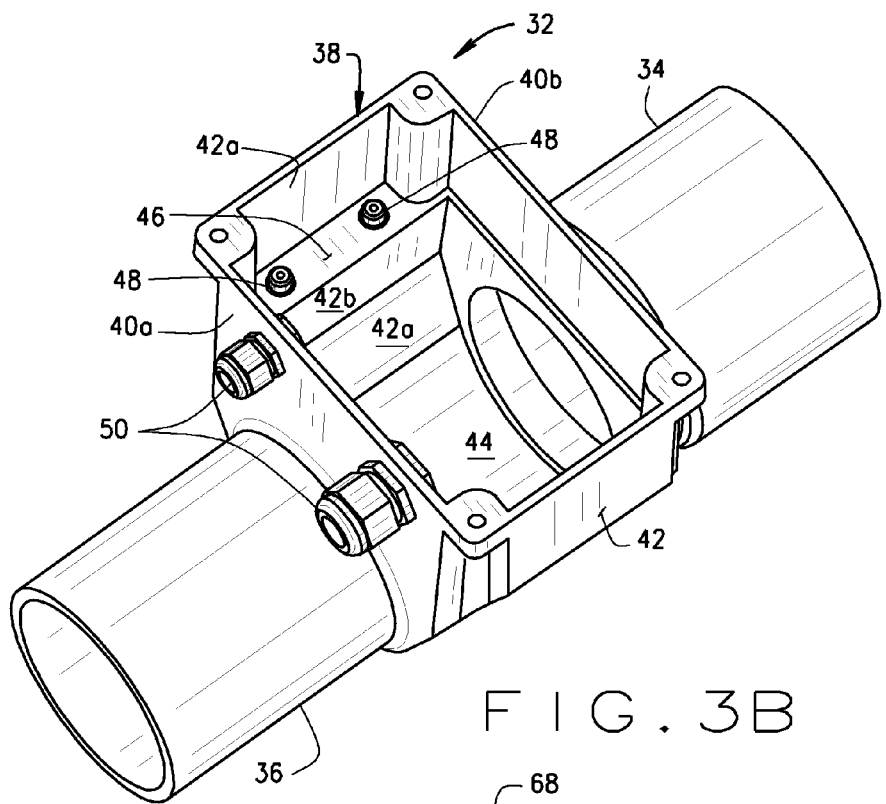
FIGS. 3A and B are top plan and top perspective views, respectively, of a housing of the assembly.

Turning to FIGS. 3A and 3B, the housing chamber 38 is defined by front and back walls 40a,b, side walls 42 and a bottom 44. The inner surfaces of the front and back walls 40a,b slope downwardly and inwardly, such that the bottoms of the walls 40a,b are closer together than the tops of the walls 40a,b. The side walls 42 include an upper section 42a, a mid-section 42b, and a lower inwardly inclined section 42c (FIG. 3B). A step 46 is formed between the upper and mid-sections 42a and 42b, such that the mid-section 42b of the side walls 42 is positioned inwardly relative to the upper section 42a. The lower inclined section 42c merges or joins with the chamber bottom 44 which is curved. Positioning posts 48 are positioned on the step 46. Two positioning posts are shown in each step, but more (or fewer) could be provided if desired. As seen in FIG. 3B, the inlet and outlet tubes 34 and 36 intersect the front and back walls 40a,b such that the bottoms of the tubes are spaced slightly from the bottom 44 of the chamber. Lastly, the chamber 38 is provided with a pair of wire connectors 50 which are positioned on the housing chamber front wall 40a. The wire connectors 50 are comprised of metal and define a bore which extends through the connectors 50. The connectors 50 can each include a main portion having a stem which extends through a hole in the wall 40a and a securing member which holds the connector main portion in place. For example, the stem can be threaded, and the securing member can be a nut-like member.

Figure 4A:
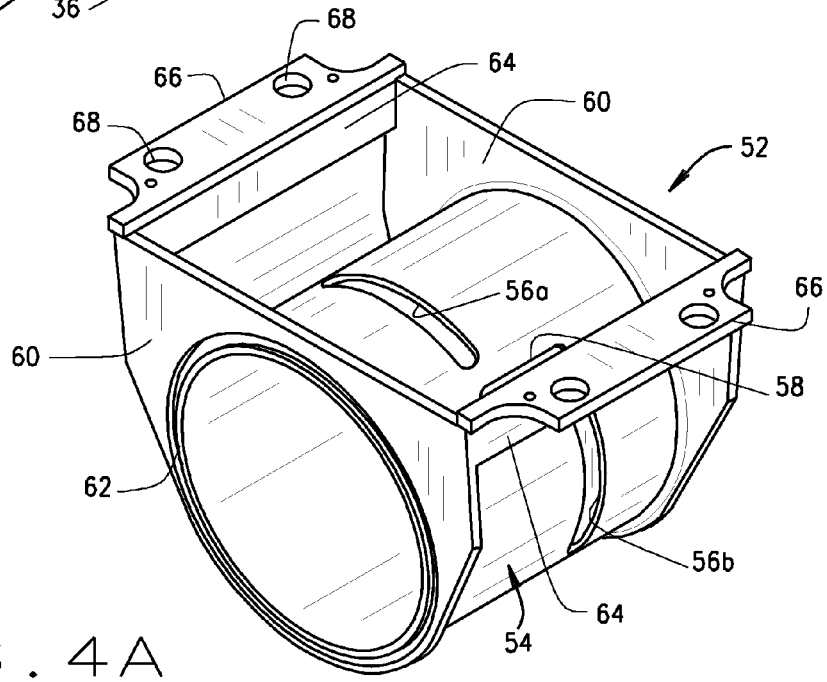
FIGS. 4A-D are perspective, side elevational, top plan, and bottom plan views, respectively of a tube member of the assembly.
Figure 4B:
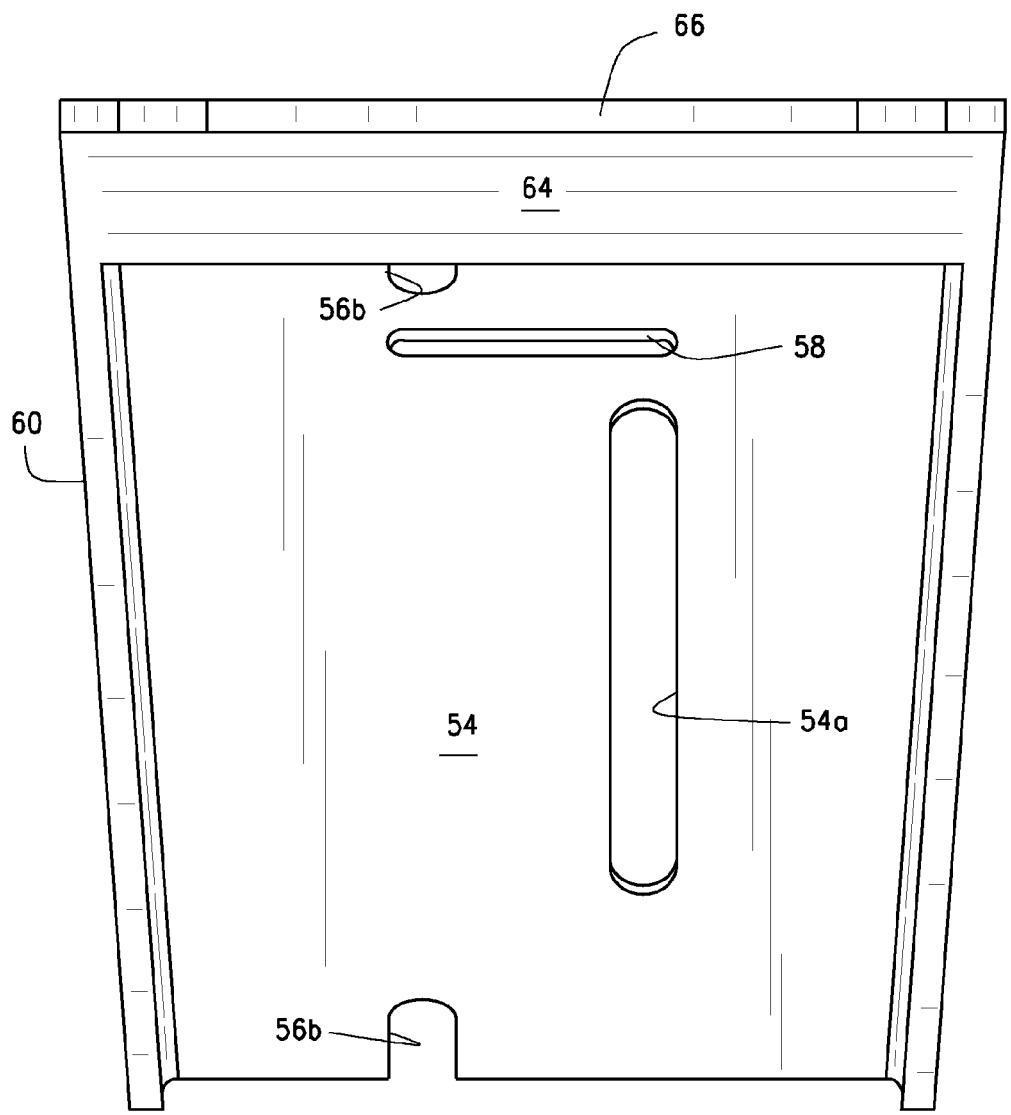
Figure 4C:
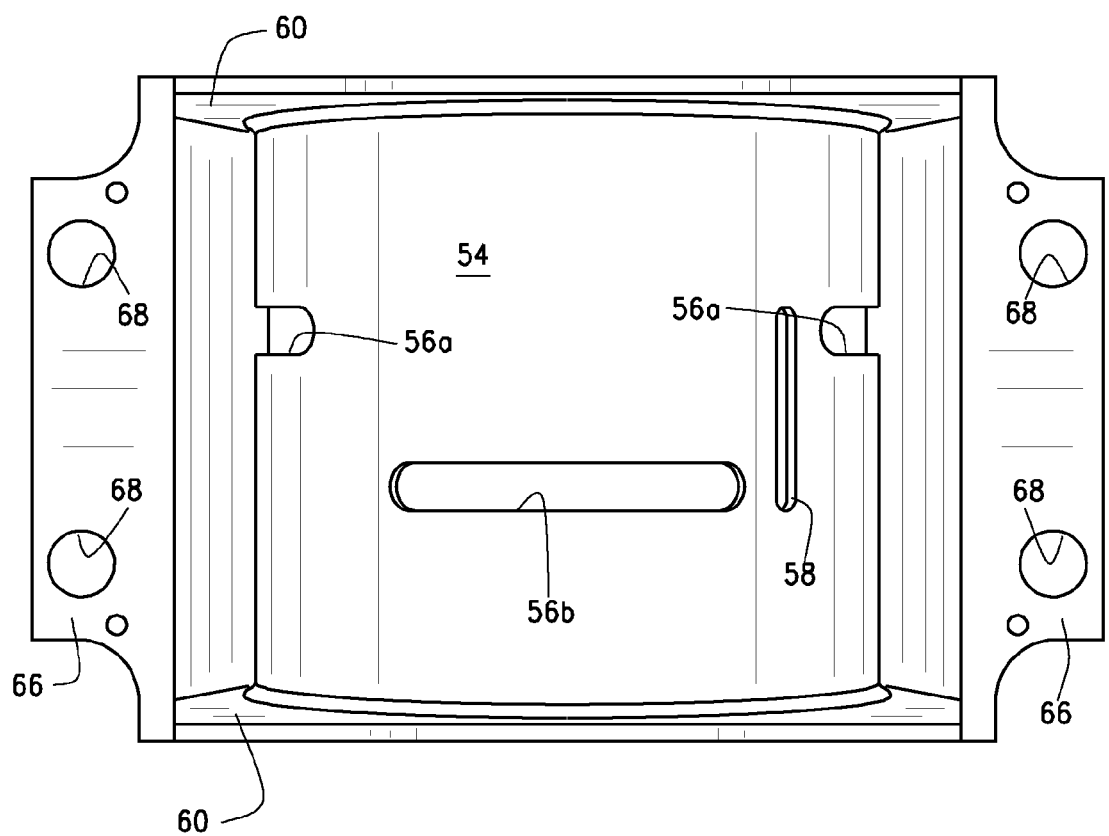
Figure 4D:
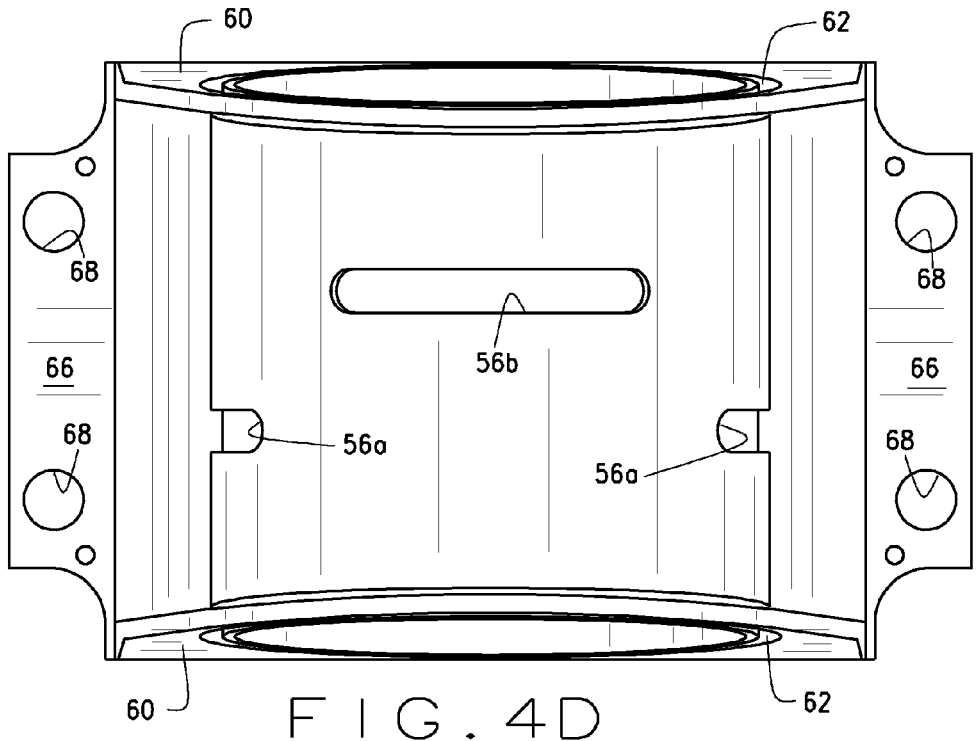

A tube member 52 (FIGS. 4A-D) is received in the chamber 38. The tube member comprises a tube 54 of a diameter substantially equal to the diameter of the junctions of the inlet and outlet tubes 34, 36 with the chamber 38. The tube 54 has a length substantially equal to the distance between the front and back chamber walls 40a,b. Further, the opposite ends of the tube have a slope or incline corresponding to the slope or incline of the chamber walls. Hence, when the tube member 52 is received in the chamber, the tube 54 will define a passage between the inlet and outlet tubes 34, 36 to form a substantially continuous flow passage through the control assembly 30. The tube 54 includes circumferentially extending slots 56a,b. Two slots 56a are formed on opposing sides of the tube 54 and two slots 56b are formed on the top and bottom of the tube 54. As best seen in FIGS. 4A-D, the slots 56a are aligned with and face each other and the slots 56b are aligned with and face each other. However, the slots 56a and 56b are axially offset from each other. Additionally, an axially extending slot 58 is positioned between the top circumferentially extending slot 56b and one of the side circumferentially extending slots 56a. The axially extending slot is shown to have a length such that one end of the slot is approximately aligned with the side slot 56a and the other end is approximately aligned with the side slot 56b, as best seen in FIG. 4B.

Front and back walls 60 extend outwardly from opposite ends of the tube 54. The walls 60 are sized and shaped to correspond to the size and shape of the chamber 38, such that the walls 60 can be received in the chamber 38. As best seen in FIG. 4B, the walls 60 are not perpendicular to the axis of the tube 54. Rather, the walls 60 slope downwardly and inwardly, such that the bottom of the opposed walls 60 are closer together than the top of the opposed walls 60. A groove 62 (FIG. 4A) can be formed in the walls 60 around the tube 54. The grooves 62 can receive sealing elements, such as O-rings, to form a seal between the tube member 52 and the inlet and outlet tubes 34, 36 of the housing 32. A connector 64 extends between the front and back walls 60, preferably at the top thereof; and mounting members or flanges 66 extend outwardly from the connectors 64. The mounting members or flanges 66 are sized to be received on top of the step 46 in the housing chamber 38. The mounting flanges 66 each have a pair of positioning openings 68 which are sized and positioned to fit over the positioning posts 48 of the chamber step 46. The sides of the tube member 52 are opened to allow access to the tube 54. That is, the tube 54 is not fully enclosed. Preferably, at least the tube 54 of the tube member 52 is made from a material through which infrared light can pass. Hence, the tube 54 is at least translucent, and preferably transparent, to infrared light, such that infrared light can pass through the wall defining the tube 54.

The tube 54 and the walls 60 of the tube member 52 are sized and shaped such that when the tube member 52 is received in the chamber 38, the tube 54 will be coaxially aligned with the inlet and outlet tubes 34, 36 of the housing 32. Thus, the housing inlet tube 34, the tube member tube 54, and the housing outlet tube 36 define a portion of the drop tube of the feeding system.

Figures 5A, 5B:
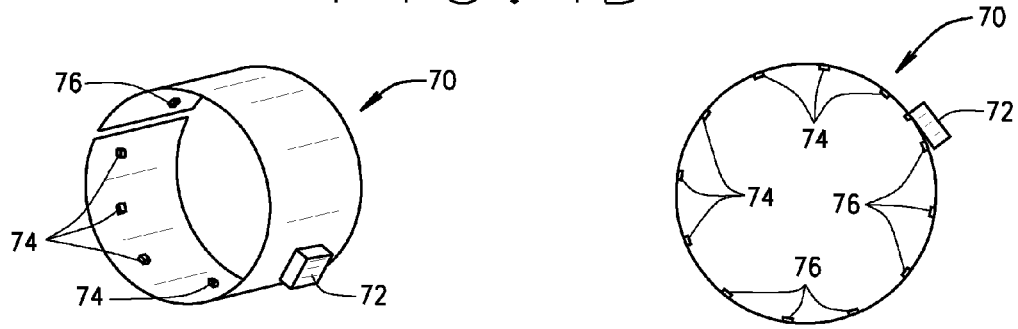
FIGS. 5A-B are perspective and front elevational views, respectively of a flexible control board of the controller in a curved condition.
Figure 5C:
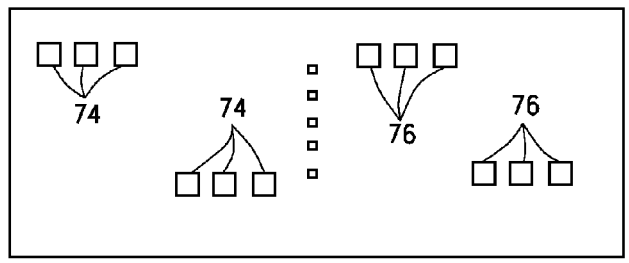
FIG. 5C is a plan view of the flexible control board in a flat condition.
Figure 6:
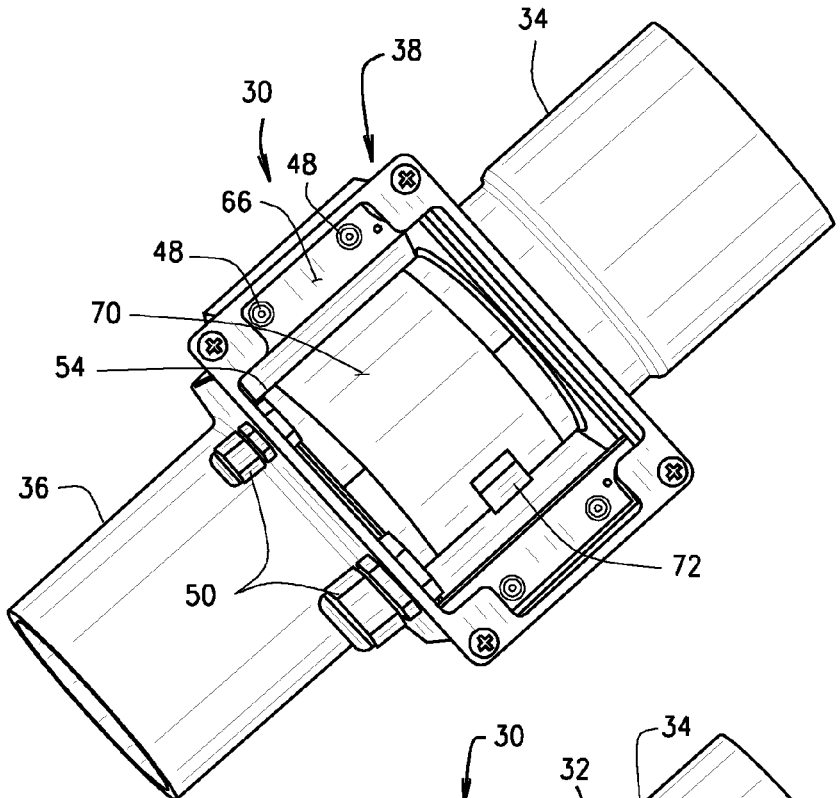
FIG. 6 is a top perspective view of the assembly with a cover removed showing the tube member with the control board positioned in the housing.
Figure 7:
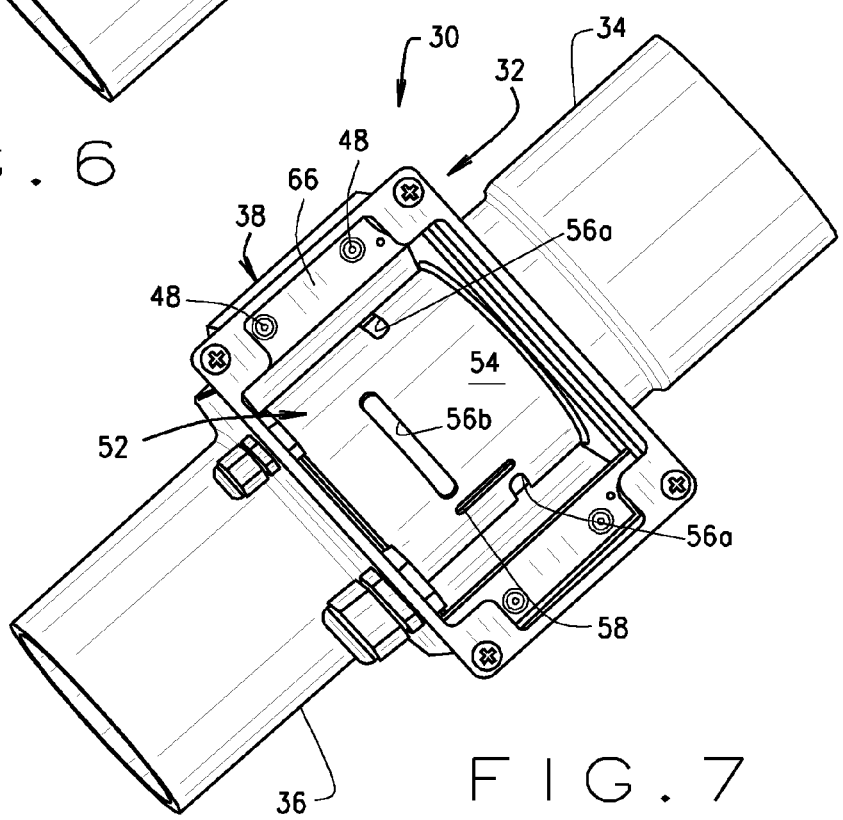
FIG. 7 is a top perspective view of the assembly with the cover and control board removed showing the tube member in the housing.

A flexible circuit board 70 (FIGS. 5A-C) is wrapped about the tube 54 of the tube member 52. The flexible circuit board 70 includes a microprocessor or controller 72 on one surface of the board 70 and a plurality of infrared emitters 74 and infrared receivers 76 on an opposite surface of the board. The infrared emitters and receivers are electrically connected to the controller, for example, by printed circuits in the flexible circuit board 70. The flexible circuit board 70 is shown in a flat—unrolled—condition in FIG. 5C. As seen therein, the infrared receivers 76 and the infrared emitters 74 are formed in groups of three. Further, there are two groups of receivers 76 and two groups of emitters 74, the two groups being offset from each other. The infrared receivers and the infrared emitters are positioned on the circuit board, and the circuit board is sized, such that when the board is wrapped about the tube 34, the infrared emitters 74 will be opposed to the infrared receivers 76, as can be seen in FIG. 5B. Further, as seen, the infrared receivers and emitters are on an inner surface of the circle defined by the circuit board, and the controller 72 is on an outer surface of the circle defined by the circuit board 70. This provides for two sets of emitters/receivers which emit infrared light at approximately right angles to each other and axially off set from each other. As is known, the receivers detect the light from the emitters. When the light beam is cut, the controller will detect such, and issue a signal indicative of the fact that the light beam has been cut.

Returning to FIG. 2B, the control assembly 30 lastly includes a gasket 80 which is sized to fit on top of the chamber 38 and a cover 82 which is secured to the chamber 80, for example, by means of screws 84. The cover 82 thus closes the chamber 38.

To assemble the control assembly 30, initially the flexible circuit board 70 is wrapped about the tube member tube 54. The circumferential slots 56a,b of the tube 54 are positioned such that the emitters 74 (which can be LEDs) and receivers 76 of the circuit board 70 will align with the slots 56a,b. The tube member 52 with the circuit board 70 is then placed in the chamber 38. When placed in the chamber 38, the mounting flanges 66 of the tube member 52 rest on the chamber step 42c with the mounting holes 68 of the flanges 66 receiving the step positioning posts 48. As noted above, the tube member tube 54 connects the inlet and outlet tubes 34, 36 of the housing to define a flow passage through the assembly 30. The fit between the tube member and chamber is preferably a tight fit so that the tube member will not be easily dislodged from the chamber, and to help form the seal between the tube member and the chamber around the junction between the tube 54 and the inlet and outlet tubes 34,36, so as to reduce the possibility of particulate matter from exiting the flow path. However, if desired, the tube member 52 can be secured in place by screws which extend through the mounting flanges 66 into the housing step 46. Leads from the controller/microprocessor 72 are connected to the wire connectors 50 of the housing. The gasket 80 and cover 82 are then positioned over the chamber to close the chamber. The control assembly 30 can then be placed in line in a drop tube 20. The control assembly can be placed in electrical communication with the controller for the system (which activates and deactivates the motor 18) by means of wires (not shown) which are connected at one end to the wire connectors 50 on the control assembly 30 (and thus are in communication with the circuit board 70) and are connected at the other end to the system controller. If desired, a wireless communication could be provided for, in lieu of the wired connection between the circuit board 70 and the system controller.

In operation, feed will flow through the drop tube 20, as generally described above. When the feed fills up the drop tube 20 containing the control assembly 30, the feed will fill the control assembly tube 54 and the light beam (from the emitters 74 to the receivers 76) will be interrupted. This will cause the circuit board controller 72 to send a signal to the system controller, and, the system controller will deactivate the auger motor 18 to stop the flow of feed through the feed system 10.

As can be appreciated, the infrared emitters and receivers are recessed relative to the inner surface of the tube member tube 54 (through which grain flows). Thus, the infrared emitters and receivers are protected from direct contact with the feed. This will help keep the emitters and receivers clean. Further, because the tube 34 is made from infrared translucent or transparent material, the slots 56*a,b* need not extend all the way through the tube wall or can even be omitted. In the former case, the slots would be formed in the outer surface of the tube wall. In either event, this will totally isolate the emitters and receivers from the feed flowing through the tube 54, thereby preventing feed dust and particles from contacting the electronic components of the sensor assembly 30. The provision of the slots places the emitters and receivers closer to the flowing feed, and limits the amount of tubing material through which the infrared light must pass. The slots can be formed as grooves in the outer surface or the slots can pass through the tube 34, in which case the emitters and receivers are recessed from the flowing feed. In the former case, the emitters and receivers remain totally isolated from the flowing feed; and in the latter case the emitters and receivers are protected from the flowing feed by their being recessed relative to the inner surface of the tube.

Additionally, the tube assembly 52 is not permanently fixed in place. It can be removed for cleaning, repair or replacement without the need to disconnect the housing 32 from the drop tube. As can be appreciated, the fact that the housing does not need to be removed in order to repair or replace the sensor assembly greatly eases the ability to repair or replace the sensor assembly.

As various changes could be made in the above constructions without departing from the scope of the invention, it is intended that all matter contained in the above description or shown in the accompanying drawings shall be interpreted as illustrative and not in a limiting sense. For example, if the slots extend through the tube member tube 54, the tube member tube could be made from material which is opaque to infrared light. This example is merely illustrative.

The invention claimed is:

1. A control assembly for use in a feed delivery assembly; the control assembly comprising:
    a housing having an inlet, an outlet, and a chamber between said inlet and outlet; said chamber being opened in a plane parallel to, but radially offset from, an axis of the inlet and outlet;
    a tube member removably receivable in said chamber; said tube member comprising a tube having a length sufficient to span a distance between said inlet and outlet tubes; said tube member tube being aligned with said housing inlet and outlet when said tube member is received in said chamber;
    at least one infrared emitter and at least one infrared receiver mounted on said tube member tube; said at least one emitter and at least one receiver being operatively connected to a controller; said emitter and receiver being opposed to each other relative to said tube member tube such that said receiver will receive and detect light from said emitter; said controller emitting a signal when it is determined that the light from the emitter to the receiver is interrupted.

2. The control assembly of claim 1 wherein said tube member tube is made from infrared translucent or infrared transparent material.

3. The control assembly of claim 1 wherein said tube member tube includes at least one pair of opposed slots; said emitter being positioned in one of said slots and the receiver being positioned in the opposite slot.

4. The control assembly of claim 3 wherein said slots are formed in an outer surface of said tube member tube and do not extend through said tube member tube.

5. The control assembly of claim 3 wherein said slots extend through said tube member tube.

6. The control assembly of claim 1 wherein said at least one infrared emitter; said at least one infrared receiver and said controller are part of a flexible circuit board; said flexible circuit board surrounding said tube member tube.

7. The control assembly of claim 1 wherein said tube member comprises a seal receiving groove at opposite ends of said tube; and a seal member received in said groove to form a seal between said tube member tube and said chamber when said tube member is received in said chamber.

8. The control assembly of claim 1 wherein said at least one emitter and receiver comprise a first pair emitter/receiver pair and a second emitter/receiver pair; said first and second pairs of emitter/receivers being axially offset from each other.

9. The control assembly of claim 1 wherein said at least one emitter and at least one transceiver comprise at least one emitter array and at least one receiver array; said emitter array comprising at least two emitters and said receiver array comprising at least two receivers.

10. A control assembly for use in a feed delivery assembly; the control assembly comprising:
    a housing having an inlet, an outlet, and a chamber between said inlet and outlet; said chamber being opened in a plane parallel to, but radially offset from, an axis of the inlet and outlet;
    a tube member removably receivable in said chamber; said tube member comprising a tube having a length sufficient to span a distance between said inlet and outlet tubes; said tube member tube being aligned with said housing inlet and outlet when said tube member is received in said chamber;

a flexible circuit board at least partially surrounding said tube member tube; said circuit board defining an inner surface which faces said tube member tube and an outer surface which faces away from said tube member tube; said circuit board comprising; at least one infrared emitter and at least one infrared receiver mounted operatively connected to a controller; said at least one infrared receiver and said at least one infrared emitter being on said inner surface of said circuit board and being positioned on said circuit board to be opposed to each other when said circuit board is positioned on said tube member tube, such that said at least one receiver will receive and detect light from said at least one emitter; said controller emitting a signal when it is determined that the light from the emitter to the receiver is interrupted.

11. The control assembly of claim 10 wherein said tube member tube is made from infrared translucent or infrared transparent material.

12. The control assembly of claim 10 wherein said tube member tube includes at least one pair of opposed slots; said emitter being positioned in one of said slots and the receiver being positioned in the opposite slot.

13. The control assembly of claim 12 wherein said slots are formed in an outer surface of said tube member tube and do not extend through said tube member tube.

14. The control assembly of claim 12 wherein said slots extend through said tube member tube.

15. The control assembly of claim 10 wherein said at least one emitter and receiver comprise a first pair emitter/receiver pair and a second emitter/receiver pair; said first and second pairs of emitter/receivers being axially offset from each other.

16. The control assembly of claim 10 wherein said at least one emitter and at least one transceiver comprise at least one emitter array and at least one receiver array; said emitter array comprising at least two emitters and said receiver array comprising at least two receivers.

17. A feed delivery system for an animal house; the feed delivery system comprising a hopper adapted to contain feed; a plurality of feed bins; a feed delivery tube; drop tubes which deliver feed from the feed delivery tube to the bins and a control assembly positioned in a drop tube; the control assembly being in communication with a motor of the feed delivery system to control the feed delivery system; the control assembly comprising:

a housing having an inlet, an outlet, and a chamber between said inlet and outlet; said chamber being opened; said housing inlet and outlet being connectable to tubing of the drop tube in which the control assembly is positioned;

a tube member removably receivable in said chamber; said tube member comprising a tube having a length sufficient to span a distance between said inlet and outlet tubes; said tube member tube being aligned with said housing inlet and outlet when said tube member is received in said chamber;

a flexible circuit board at least partially surrounding said tube member tube; said circuit board defining an inner surface which faces said tube member tube and an outer surface which faces away from said tube member tube; said circuit board comprising; at least one infrared emitter and at least one infrared receiver mounted operatively connected to a controller; said at least one infrared receiver and said at least one infrared emitter being on said inner surface of said circuit board and being positioned on said circuit board to be opposed to each other when said circuit board is positioned on said tube member tube, such that said at least one receiver will receive and detect light from said at least one emitter; said controller emitting a signal when it is determined that the light from the emitter to the receiver is interrupted.

\* \* \* \* \*